United States Patent Office 3,557,051
Patented Jan. 19, 1971

3,557,051
STABILIZED VINYL FLUORIDE POLYMERS
Yutaka Kometani, Nishinomiya-shi, Shun Koizumi, Osaka-shi, and Takeshi Suzuki and Chuzo Okuno, Settsu-shi, Japan, assignors to Daikin Kogyo Kabushiki Kaisha, Kita-ku, Osaka-shi, Japan, and Kansai Paint Company Limited, Hyogo-ken, Japan
No Drawing. Filed Apr. 1, 1968, Ser. No. 717,958
Claims priority, application Japan, Apr. 3, 1967, 42/21,428
Int. Cl. C08f *45/56, 45/58, 45/60*
U.S. Cl. 260—45.8                  7 Claims

ABSTRACT OF THE DISCLOSURE

A heat-stable composition comprising a vinyl fluoride polymer, 0.01 to 5 weight percent of an inorganic non-metallic reducing agent, based on the weight of the vinyl fluoride polymer and 0.01 to 5 weight percent of an organic antioxidant having a boiling point of higher than the melting point of the vinyl fluoride polymer, based on the weight of the vinyl fluoride polymer.

---

This invention relates to stabilized vinyl fluoride polymers and particularly to compositions containing polyvinyl fluoride of improved heat stability.

Vinyl fluoride polymers, such as polyvinyl fluoride, have excellent properties suitable for films, laminates, mouldings, etc. For example, hardness, impact strength, chemical resistance and weather resistance of such polymers are all well for such purposes. However, the thermal stability thereof in the vicinity of its melting point is relatively poor. In fact, when polyvinyl fluoride is heated at its melting point the polymer discolors and degrades rapidly. Lack of thermal stability makes it difficult to subject the vinyl flouride polymers to melt extrusion techniques and laminating procedures commonly performed at elevated temperatures as well as to produce white or light colored products.

In general, polymeric vinyl chlorides are also poor in thermal stability and are subject to discoloration and degradation under the influence of heat. Therefore, various stabilizers to prevent such discoloration and degradation have been proposed. However, many of such known stabilizers which are effective for the polymeric vinyl chlorides or olefins are not so effective in the case of vinyl fluoride polymers.

It is an object of the invention to provide new and useful compositions containing vinyl fluoride polymers of improved thermal stability.

Further object of the invention is to provide polyvinyl fluoride compositions capable of moulding or laminating at elevated temperatures, particularly in the vicinity of the melting point of the polymer, to produce self-supporting films, mouldings, laminates, etc., free from undesired discoloration and degradation.

According to the researches of the present inventors, it has been found that when a certain inorganic non-metallic reducing agent is used in a specific amount in combination with the stabilizers for polyvinyl chlorides or polyolefins which have been considered almost ineffective in the case of polyvinyl fluoride, synergistic effect can be displayed and thermal stability of vinyl fluoride polymers is markedly improved.

This invention is based on the above discovery, and compositions of the invention comprise vinyl fluoride polymer, 0.01 to 5 weight percent of an inorganic non-metallic reducing agent, based on the weight of the vinyl fluoride polymer and 0.01 to 5 weight percent of at least one organic antioxidant having a boiling point of higher than the melting point of the vinyl fluoride polymer, based on the weight of the vinyl fluoride polymer.

The vinyl fluoride polymers used in the invention include a homopolymer of vinyl fluoride and a copolymer of at least 75 weight percent of vinyl fluoride and at the most 25 weight percent of other copolymerizable monomers. One, or a combination, of such polymers may be employed in the compositions of the present invention. In general, these vinyl fluoride polymers are solids having a melting point of about 190 to 230° C. The copolymerizable monomers are (1) ethylene series hydrocarbons such as ethylene, propylene, isobutylene, styrene, etc.; (2) haloethylene series hydrocarbons such as vinyl chloride, vinyl bromide, vinylidene chloride, vinylidene fluoride, 1,1-difluoro-2-chloroethylene, trifluorochloroethylene, tetrafluoroethylene, 1,1,1-trifluoropropylene, hexafluoropropylene, etc.; (3) vinyl esters such as vinyl formate, vinyl acetate, vinyl propionate, vinyl butylate, vinyl pivalate, vinyl benzoate, vinyl stearate, vinyl sulfonate, vinyl phosphate, etc.; (4) vinyl ethers such as vinyl ethyl ether, tetrafluoroethyl allyl ether, vinyl dioxolan, etc.; (5) acrylic acid and methacrylic acid, and derivatives thereof such as esters, nitriles, amides, anhydrides, halides, etc.; (6) maleic acid, phmalic acid and derivatives thereof such as dimethyl maleate, dimethyl phmalate, maleic anhydride, etc.; (7) vinyl ketones such as methyl vinyl ketone, etc.; (8) vinyl imides such as N-vinyl phthalimide, N-vinyl saccineimide, etc.; and (9) propenyl esters such as allyl acetate, isopropenyl acetate, etc.

The antioxidants used in the invention are known in the art as a stabilizer for the polymeric vinyl chlorides or olefins and should have a boiling point of higher than the melting point of the vinyl fluoride polymer. If an antioxidant of lower boiling point is used, it evaporates off by heat applied to mould or laminate the composition. Usually the antioxidant of a boiling point of above 200° C. is preferred. The antioxidants used include phenol-based antioxidants, amine-based antioxidants, triazine-based antioxidants, imidazol-based antioxidants, thiodicarboxylic acid esters, and others. Examples of the antioxidants are (1) phenol-based antioxidants: 4,4-dihydroxybisphenyl, dihydroxydiphenylenethane and it's derivatives, hydroquinonemonobenzyl ether, 1,1-bis-(4-hydroxyphenyl)-cyclohexane, 1-oxy-3-methyl-4-isopropyl benzene, 2,4,5-trihydroxybutylrophenone, 2,4-dimethyl-6-tertiarybutylphenol, 2,6-ditertiarybutylphenol, 2,5-ditertiaryamylhydroquinone, 2,5-ditertiarybutylhydroquinone, 2,6-ditertiarybutyl-p-cresol, 4-hydroxymethyl-2,6-ditertiarybutylphenol, 4,4′-bis(2,6-ditertiarybutylphenol), 2,6-ditertiarybutyl-α-dimethylamino-p-cresol, 2,2′-methylene-bis-(4-methyl-6-tetiarybutylphenol), 2,2′-methylene-bis-(4-ethyl-6-tertiarybutylphenol), 4,4′-methylene-bis-(6-tertiarybutyl-o-cresol), 4,4′-methylene-bis-(2,6-ditertiarybutylphenol), 6-tertiarybutyl-methylphenol derivatives, 1,3,5-trimethyl-2,4,6-tris-(3,5-ditertiarybutyl-4-hydroxybenzene), 4,4′-butylidene-bis-(3-methyl-6-tertiarybutylphenol), 4,4′-thio-bis-(6-tertiarybutyl-3-methylphenol), bis-(3-methyl-4-hydroxy-5-tertiarybutylbenzilsulfide), 4,4′-thio-bis-(6-tertiarybutyl-o-cresol), 2,2′-thio-bis-(4-methyl-6-tertiarybutylphenol), thio-bis-(disecondaryamylphenol), 2,2′-dihydroxy-3,3′-di(α-methylcyclohexyl)-5,5′-dimethyldiphenylmethane, styrenated phenol, dialkylphenolsulfide, hindered phenols, high molecular weight phenol compounds, etc., (2) amine-based antioxidants: phenyl-α-naphthylamine, phenyl-β-napthylamine, N,N′-diphenyl-p-phenylenediamine, N,N′-di-β-naphthyl-p-phenylenediamine, N,N′-diallyl-p-phenylenediamine, N-isopropyl-N′-phenyl-p-phenylenediamine, 2,2,4-trimethyl-1,2-dihydroquinoline polymers, 6-ethoxy-2,2,4-trimethyl-1,2-dihydroquinoline, condensation product of diphenyl amine and acetone, condensation product of phenyl-β-naphthylamine and acetone, aldol-α- naphthylamine, etc., (3) triazine-based antioxidants: triazine derivatives e.g., 2,4-bis-(n-octylthio)-6-(4-hydroxy-3,5-di-t-butyl-anilino)-1,3,5-triazine sold under the trademark "Irganox 565," and 4-n-octylthio-2,6-bis: (4-hydroxy-3,5-di-t-butyl-anilino)-1,3,5-triazine sold as "Irganox 858" (Geigy Chemical Corp., Switzerland), etc., (4) imidazole-based antioxidants: 2-mercaptobenzoimidazole, zinc salt of 2-mercaptobenzoimidazole, etc., (5) thiodicarboxylic acid esters having the formula of $S(C_nH_{2n}COOR)_2$, wherein R is alkyl or alkenyl of 6 to 20 carbon atoms and $n$ is an integer of 1 to 4; distearyl thiodipropionate, dilauryl thiodipropionate, etc., (6) others: reaction product of morpholinium-N-oxy-diethylene-dithiocarbamate and dibenzothiazyldisulfide, reaction product of 1,1-bis-(4-hydroxyphenol)-cyclohexane and organic amines, tri-(nonylphenyl)-phosphite, hydrazine derivatives, mixtures of aromatic hydrazines and hydroquinone derivatives, etc.

In the invention it is necessary to use the antioxidant in combination with an inorganic nonmetallic reducing agent. Such inorganic nonmetallic compound per se is known and used as a reducing agent which acts as an oxygen acceptor, but as far as the applicant is aware it has not been used as a stabilizer for polymeric vinyl halides. Examples of the inorganic nonmetallic reducing agents used in the invention are sodium sulfide, potassium sulfide, ammonium sulfide, sodium polysulfide, potassium polysulfide, sodium sulfite, sodium hydrogensulfite, potassium sulfite, sodium dithionite, potassium dithionite, phosphorus trisulfide, phosphorous acid, sodium phosphite, sodium hydrogenphosphite, potassium phosphite, ammonium phosphite, sodium arsenite, potassium arsenite, ammonium arsenite, etc. Of these sodium sulfite, sodium hydrogensulfite, sodium hydrogenphosphite and sodium arsenite are particularly preferable.

In order to secure the synergistic effect of the organic antioxidant and nonmetallic reducing agent, both compounds should be mixed with the vinyl fluoride polymers in a specific range of amounts. Namely, the antioxidant is mixed in the range of 0.01 to 5 weight percent, preferably 0.1 to 3 weight percent, based on the weight of the vinyl fluoride polymer, and the reducing agent is mixed in the range of 0.01 to 5 weight percent, preferably 0.1 to 3 weight percent, based on the weight of the vinyl fluoride polymer. When the amount of one of both compounds is less than the above, synergistic effect cannot be displayed and thermal stability of the vinyl fluoride polymers is not improved sufficiently. The use of larger amount is not only uneconomical but also reduces the effect of preventing discoloration of the vinyl fluoride polymers.

The composition of the invention may be preferably used as moulding or coating compositions. To prepare the moulding compositions, for example, the nonmetallic reducing agents and antioxidants are added in a form of powder to the particulate vinyl fluoride polymers and milled by the conventional means to disperse the reducing agents and antioxidants homogeneously into the polymers. The coating compositions are prepared, for example, by mixing organic solvent solution or aqueous dispersion of vinyl fluoride polymer with the reducing agents and antioxidants.

The solvents used in preparing the coating compositions are dimethyl acetoamide, diethyl formamide, $\gamma$-butyrolactone and the like organic solvents for vinyl fluoride polymers. The amount of the solvents may vary over a wide range in accordance with the kinds of the coating compositions, but usually used in the range of 100 to 500 weight parts, based on 100 weight parts of the vinyl fluoride polymers.

The composition may contain various additives, such as resins other than vinyl fluoride polymers (e.g., vinyl butyral resin and the like resins having compatibility with the vinyl fluoride polymers), plasticizers (e.g., dicyclohexyl phthalate, diisodecyl phthalate), pigments, etc.

For fuller understanding of the invention examples are given below, in which all "parts" are shown by weight:

EXAMPLE 1

With 1 g. of polyvinyl fluoride having 1.10 intrinsic viscosity measure in $\gamma$-butyrolactone at 100° C. and $0.31\mu$ average particle size were mixed 3 g. of dimethylphthalate, 5 mg. of the following antioxidant and 5 mg. of the inorganic nonmetallic reducing agent specified in the appended Table 1, whereby polyvinyl fluoride compositions were obtained.

The antioxidants used were as follows:

A-1.—"Antigen RD," polymer of 2,2,4-trimethyl-1,2-dihydroquinoline (trademark, Sumitomo Chemical Co., Ltd., Japan).
A-2.—N,N'-di-$\beta$-naphthyl-p-phenylenediamine.
A-3.—1,1-bis-(4-hydroxyphenyl)-cyclohexane.
A-4.—1,3,5 - trimethyl-2,4,6-tris-(3,5-di-tertiarybutyl-4-hydroxybenzyl)-benzene.
A-5.—2-mercaptobenzoimidazol.
A-6.—Distearyl thiodipropionate.

The resultant composition was heated at 130° C., then applied 0.1 mm. thick to an aluminum plate of 1 mm. thick and heated at 250° C. for 7 minutes.

The degree of discoloration of each film thus obtained is shown in the following Table 1, in which the degree of discoloration was represented by the numerals as following:

(1) Not discoloured.
(2) Slightly discoloured.
(3) Light brown or light yellowish brown.
(4) Slightly more brownish.
(5) Brown to black.

TABLE 1

| | Reducing agent | | | | | |
|---|---|---|---|---|---|---|
| | None | Fe(SO₄), comparison | Na₂HSO₃ | Na₂SO₃ | NaHPO₃ | NaAsO₂ |
| Antioxidant: | | | | | | |
| None | 5 | 4 | 4 | 4 | 4 | 4 |
| A-1 | 4 | 4 | 1 | 1 | 1 | 1 |
| A-2 | 5 | 4 | 2 | 2 | 2 | 2 |
| A-3 | 4 | 4 | 1 | 1 | 1 | 1 |
| A-4 | 4 | 4 | 1 | 1 | 1 | 1 |
| A-5 | 4 | 4 | 1 | 1 | 1 | 1 |
| A-6 | 4 | 4 | 1 | 1 | | 1 |

EXAMPLE 2

To 100 weight parts of polyvinyl fluoride same as in Example 1 were added "Irganox 1010" and sodium hydrogensulfite in the amounts specified in Table 2 below, and mixed homogeneously, whereby polyvinyl fluoride compositions were obtained.

From the resultant compositions films were prepared in the same manner as in Example 1, and the degree of discoloration of each film thus obtained is shown in the following Table 2:

TABLE 2

| | Amount of antioxidant, weight part | | | | |
|---|---|---|---|---|---|
| | 0 | 0.10 | 0.25 | 0.50 | 1.00 |
| Amount of NaHSO$_3$, weight part: | | | | | |
| 0 | | 5 | | 3 | |
| 0.10 | | 1 | 1 | 1 | 1 |
| 0.25 | | 1 | 1 | 1 | 1 |
| 0.50 | 2 | 1 | 1 | 1 | 1 |
| 1.00 | | 1 | 1 | 1 | 1 |

EXAMPLE 3

To 100 weight parts of polyvinyl fluoride same as in Example 1 "Irganox 1010" and sodium arsenite were added in the amounts specified in Table 3 below, and mixed homogeneously to produce polyvinyl fluoride compositions.

From the resultant compositions films were prepared in the same manner as in Example 1, and the degree of discoloration of each film is shown in the Table 3 below:

TABLE 3

| | Amount of "Irganox 1010," weight part | | | | |
|---|---|---|---|---|---|
| | 0 | 0.10 | 0.25 | 0.50 | 1.00 |
| Amount of NaAsO$_2$, weight part: | | | | | |
| 0 | | 5 | | 3 | |
| 0.10 | | 2 | 3 | 1 | 1 |
| 0.25 | | 1 | 1 | 1 | 1 |
| 0.50 | 3 | 1 | 1 | 1 | 1 |
| 1.00 | 3 | 1 | 1 | 1 | 1 |

EXAMPLE 4

To 1 g. of polyvinyl fluoride having 1.10 of intrinsic viscosity measured in γ-butyrolactone at 100° C. and 0.4 micron of average particle size were added the amounts specified in Table 4 below of sodium hydrogensulfite, 3 g. of dimethylphthalate and 5 mg. of antioxidant specified in Table 4 and the mixture was thoroughly milled, whereby white polyvinyl fluoride compositions were obtained.

From the respective compositions films were prepared by the same manner as in Example 1 and the degree of discoloration is shown in the table.

TABLE 4.—DEGREE OF DISCOLORATION

| | NaHSO$_3$ | |
|---|---|---|
| Antioxidants | 0 mg. | 5 mg. |
| 1. Phenol-based antioxidants: | | |
| 1,1-bis-(4-hydroxyphenyl)-cyclohexane | 4 | 1 |
| 2,4-dimethyl-6-tertiarybutylphenol | 4 | 2 |
| 2,6-ditertiarybutyl-p-cresol | 4 | 2 |
| 2,2'-methylene-bis-(4-methyl-6-tertiarybutyl-phenol) | 4 | 1 |
| 4,4'-butylidene-bis-(3-methyl-6-tertiarybutyl-phenol) | 4 | 1 |
| 4,4'-thio-bis-(6-tertiarybutyl-3-methylphenol) | 2 | 1 |
| Styrenated phenol | 2 | 1 |
| Hindered phenol: | | |
| "Antioxidant 431" (Trade mark, Naugatuck Corp., U. S. A.) | 3 | 2 |
| "Irganox 1010" (Trade mark, Geigy Chemical Corp., Switzerland) | 3 | 1 |
| "Irganox 1076" (Trademark, Geigy Chemical Corp., Switzerland) | 3 | 1 |
| 2. Amine-based antioxidants: | | |
| Phenyl-α-naphthylamine | 5 | 2 |
| Phenyl-β-naphthylamine | 5 | 2 |
| N,N'-diphenyl-p-phenylenediamine | 5 | 1 |
| N,N'-di-β-naphthyl-p-phenylenediamine | 5 | 2 |
| N,N'-diallyl-p-phenylenediamine | 5 | 2 |
| N-isopropyl-N'-phenyl-p-phenylenediamine | 5 | 2 |
| Condensation product of diphenylamine and acetone | 4 | 1 |
| 6-ethoxy-2,2,4-trimethyl-1,2-dihydroquinoline | 5 | 3 |
| Condensation product of phenyl-β-naphthyl-amine and acetone | 4 | 1 |
| Mixture of phenyl-β-naphthylamine and N,N'-diphenyl-p-phenylenediamine | 3 | 1 |
| Mixture of phenyl-β-naphthylamine and N,N'-diallyl-p-phenylenediamine | 5 | 2 |
| 3. Triazine-based antioxidants: | | |
| "Irganox 565" (Trademark, Geigy Chemical Corp., Switzerland) | 5 | 1 |
| "Irganox 858" (Trademark, Geigy Chemical Corp., Switzerland) | 4 | 1 |

TABLE 4.—Continued

| | NaHSO$_3$ | |
|---|---|---|
| Antioxidants | 0 mg. | 5 mg. |
| 4. Imidazole-based antioxidants; Zinc salt of 2-mercaptobenzoimidazol | 4 | 1 |
| 5. Thiodicarboxylic acid esters: | | |
| Dilauryl-thiodipropionate | 4 | 2 |
| Distearyl-thiodipropionate | 4 | 1 |
| 6. Others: | | |
| Reaction product of morpholinium-N-oxy-diethylene-dithiocarbamate and dibenzo-thiazyl-disulfide | 4 | 1 |
| Reaction product of 1,1-bis-(4-hydroxyphenol)-cyclohexane and organic amines | 4 | 1 |
| Tri-(nonylphenol)-phosphite | 3 | 2 |

What we claim is:

1. A heat-stable composition comprising a vinyl fluoride polymer containing at least 75 weight percent of vinyl fluoride, 0.01 to 5 weight percent of an inorganic reducing agent, based on the weight of the vinyl fluoride polymer, and 0.01 to 5 weight percent of an organic antioxidant having a boiling point of higher than the melting point of the vinyl fluoride polymer, based on the weight of the vinyl fluoride polymer: said inorganic reducing agent being selected from the group consisting of sodium sulfide, potassium sulfide, ammonium sulfide, sodium polysulfide, potassium polysulfide, sodium sulfite, sodium hydrogensulfite, potassium sulfite, sodium dithionite, potassium dithionite, phosphorus trisulfide, phosphorus acid, sodium phosphite, sodium hydrogenphosphite, potassium phosphite, ammonium phosphite, sodium arsenite, potassium arsenite and ammonium arsenite: and said organic antioxidant being selected from the group consisting of (1) a phenol-based antioxidant selected from the group consisting of 4,4' - dihydroxybiphenyl, dihydroxydiphenylmethane, hydroquinonemonobenzyl ether, 1,1-bis-(4-hydroxyphenyl) - cyclohexane, 1-hydroxy-3-methyl - 4 - isopropyl benzene, 2,4,5-trihydroxybutyrophenone, 2,4 - diemthyl-6-tertiarybutylphenol, 2,6 - ditertiarybutylphenol, 2,5 - ditertiaryamylhydroquinone, 2,6 - ditertiarybutyl - p - cresol, 4-hydroxymethyl - 2,6 - ditertiarybutylphenol, 4,4' - bis-(2,6 - ditertiarybutylphenol), 2,6 - ditertiarybutyl-α-dimethylamino - p - cresol, 2,2'-methylene - bis-(4-methyl - 6 - tertiarybutylphenol), 2,2'-methylene-bis-(4 - ethyl - 6 - tertiarybutylphenol), 4,4'-methylene-bis - (6-tertiarybutyl - o - cresol, 4,4'-methylene-bis-(2,6-ditertiarybutylphenol), 1,3,5 - trimethyl-2,4,6-tris - 3,5-ditertiarybutyl - 4 - hydroxybenzyl)-benzene, 4,4' - butylidene - bis - (3-methyl-6-tertiarybutylphenol), 4,4' - thio - bis - (6-tertiarybutyl-3-methylphenol), bis - (3 - methyl-4-hydroxy-5-tertiarybutylbenzyl)sulfide, 4,4' - thio - bis-(6-tertiarybutyl - o - cresol), 2,2' - thio - bis-(4-methyl-6-tertiarybutylphenol), thio - bis - (disecondaryamylphenol), 2,2' - dihydroxy - 3,3'-di-(α-methylcyclohexyl)-5,5' - dimethyl - diphenylmethane, and styrenated phenol, (2) an amine-based antioxidant selected from the group consisting of phenyl-α-naphthylamine, phenyl-β - naphthylamine, N,N' - diphenyl-p-phenylenediamine, N,N' - di - β - naphthyl-p-phenylenediamine, N,N' - diallyl - p - phenylenediamine, N-isopropyl-N' - phenyl - p - phenylenediamine, 2,2,4-trimethyl-1,2 - dihydroquinoline polymer, 6 - ethoxy - 2,2,4-trimethyl - 1,2 - dihydroquinoline, condensation production of diphenyl amine and acetone, condensation product of phenyl - β - naphthylamine and acetone and aldol-α-naphthylamine, (3) a triazine-based antioxidant selected from the group consisting of 2,4 - bis-(n-oxtylthio)-6-(4-hydroxy-3,5-di-t-butyl-anilino) - 1,3,5-triazine and 4-n-octylthio - 2,6 - bis (4 - hydroxy - 3,5,di-t-butyl-anilono) 1,3,5-triazine, (4) an imidazole-based antioxidant selected from the group consisting of 2-mercaptobenzimidazole and zinc salt of 2-mercaptobenzimidazole, (5) a thmiodicarboxylic acid ester having the formula of $S(C_nH_{2n}COOR)_2$, wherein R is an alkyl or alkenyl of 6 to 20 carbon atoms and $n$ is an integer of 1 to 4, or (6) tri-(nonylphenyl)-phosphite antioxidant.

2. The heat-stable composition according to claim 1, in which said organic antioxidant is at least one phenol-based antioxidant selected from the group consisting of 4,4'-dihydroxylbiphenyl, dihydroxydiphenylmethane, hydroquinonemonobenzyl ether, 1,1 - bis - (4-hydroxyphenyl)-cyclohexane, 1 - hydroxy - 3 - methyl-4-isopropyl benzene, 2,4,5 - trihydroxybutyrophenone, 2,4 - dimethyl-6-tertiarybutylphenol, 2,6 - ditertiarybutylphenol, 2,5 - ditertiaryamylhydroquinone, 2,5 - ditertiarybutylhydroquinone, 2,6 - ditertiarybutyl - p - cresol, 4-hydroxymethyl-2,6 - ditertiarybutylphenol, 4,4' - bis - (2,6-ditertiarybutylphenol), 2,6 - diteritarybutyl - α - dimethylamino-p-cresol, 2,2' - methylene - bis - (4-methyl-6-tertiarybutylphenol), 2,2' - methylene - bis - (4 - ethyl-6-tertiarybutylphenol), 4,4' - methylene - bis - (6-tertiarybutyl-o-cresol, 4,4' - methylene)-bis-(2,6) - ditertiarybutylphenol), [6-tertiarybutyl - methylphenol derivative,]1,3,5 - trimethyl - 2,4,6-tris - (3,5 - ditertiarybutyl-[ditertiarybutyl]4 - hydroxybenzyl)-benzene, 4,4' - butylidene-bis-(3-methyl - 6 - tertiarybutylphenol), 4,4' - thio - bis - (6-tertiarybutyl-3-methylphenol), bis - (3-methyl - 4 - hydroxy - 5 - tertiarybutyl - benzilsulfide), 4,4' - thio - bis - (6-tertiarybutyl-o-cresol), 2,2' - thio - bis - (4-methyl - 6 - tertiarybutylphenol), thio - bis - (disecondaryamylphenol), 2,2' - dihydroxy - 3,3' - di - (α-methylcyclohexyl)5,5'-dimethyldiphenylmethane, and styrenated phenol.

3. The heat-stable composition according to claim 1, in which said organic antioxidant is at least one amine-based antioxidant selected from the group consisting of phenyl-α-naphthylamine, phenyl-β-naphthylamine, N,N'-diphenyl - p - phenylenediamine, N,N'-di-β-naphthyl-p-phenylenediamine, N,N' - diallyl-p-phenylenediamine, N-isopropyl - N' - phenyl - p - phenylenediamine, 2,2,4-trimethyl - 1,2 - dihydroquinoline polymer, 6 - ethoxy-2,2,4-trimethyl - 1,2-dihydroquinoline, condensation product of diphenyl amine and acetone, condensation product of phenyl-β-naphthylamine and acetone, and aldol-α-naphthylamine.

4. The heat-stable composition according to claim 1, in which said organic antioxidant is at least one triazine-based antioxidant selected from the group consisting of 2,4-bis-(n-octylthio) - 6 - (4 - hydroxy-3-di-t-butyl-anilino)-1,3,5-triazine and 4-n-octylthio-2,6-bis-(4-hydroxy-3,5-di-t-butyl-anilino)-1,3,5-triazine.

5. The heat-stable composition according to claim 1, in which said organic antioxidant is at least one imidazole-based antioxidant selected from the group consisting of 2-mercaptobenzoimidazole and zinc salt of 2-mercaptobenzomidazole.

6. The heat-stable composition according to claim 1, in which said organic antioxidant is at least one thiodicarboxylic acid ester selected from the group consisting of distearyl thiodipropionate and dilauryl thiodipropionate.

7. The heat-stable composition according to claim 1, in which said inorganic reducing agent is one member of the group consisting of sodium sulfite, sodium hydrogen sulfite, sodium hydrogenphosphite and sodium arsenite.

References Cited
UNITED STATES PATENTS

| | | | |
|---|---|---|---|
| 2,140,518 | 12/1938 | Doolittle | 260—45.7 |
| 2,478,862 | 8/1949 | Cox et al. | 260—45.7 |
| 2,919,259 | 12/1959 | Naylor et al. | 260—45.95 |
| 2,985,617 | 5/1961 | Salyer et al. | 260—45.7 |
| 2,990,394 | 6/1961 | Ainsworth et al. | 260—45.8 |
| 3,018,269 | 1/1962 | Bruno | 260—45.8 |
| 3,325,447 | 6/1967 | Kasparik | 260—45.9 |
| 3,352,820 | 11/1967 | Bawn | 260—45.75 |
| 3,442,853 | 5/1969 | Gobstein | 260—45.95 |
| 3,454,517 | 7/1969 | Neros et al. | 260—30.4 |

DONALD E. CZAJA, Primary Examiner

R. A. WHITE, Assistant Examiner

U.S. Cl. X.R.

260—45.7, 45.85, 45.9, 45.95